United States Patent
Perfetto et al.

(10) Patent No.: US 12,510,044 B2
(45) Date of Patent: Dec. 30, 2025

(54) PROPANE FUEL SYSTEM THERMAL MANAGEMENT SYSTEMS AND METHODS

(71) Applicant: Cummins Inc., Columbus, IN (US)

(72) Inventors: Anthony Kyle Perfetto, Columbus, IN (US); Samuel C. Geckler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/815,988

(22) Filed: Jul. 29, 2022

(65) Prior Publication Data

US 2024/0035432 A1 Feb. 1, 2024

(51) Int. Cl.
*F02M 31/14* (2006.01)
*F02M 21/02* (2006.01)
*F02M 31/18* (2006.01)

(52) U.S. Cl.
CPC ........ *F02M 31/14* (2013.01); *F02M 21/0215* (2013.01); *F02M 21/0227* (2013.01); *F02M 31/183* (2013.01)

(58) Field of Classification Search
CPC .............. F02M 31/14; F02M 21/0215; F02M 21/0227; F02M 31/183
See application file for complete search history.

(56) References Cited

U.S. PATENT DOCUMENTS

| | | |
|---|---|---|
| 4,528,966 A | 7/1985 | Lent et al. |
| 5,499,615 A | 3/1996 | Lawrence et al. |
| 9,409,560 B2 | 8/2016 | Larsson et al. |
| 10,239,518 B2 | 3/2019 | Styles et al. |
| 11,035,326 B2 | 6/2021 | Perfetto et al. |
| 2006/0064232 A1 | 3/2006 | Ampunan et al. |
| 2010/0139628 A1 | 6/2010 | Pursifull et al. |
| 2011/0247593 A1* | 10/2011 | Yoshizaki ............... F02M 31/18 123/520 |
| 2012/0291738 A1 | 11/2012 | Hobart et al. |
| 2015/0345436 A1 | 12/2015 | Yang et al. |
| 2019/0203663 A1* | 7/2019 | Harness ............. F02M 21/0221 |
| 2021/0025364 A1* | 1/2021 | Hao ...................... F02D 41/064 |

FOREIGN PATENT DOCUMENTS

GB 2298900 B 6/1998

* cited by examiner

*Primary Examiner* — Syed O Hasan
(74) *Attorney, Agent, or Firm* — Taft, Stettinius & Hollister LLP

(57) ABSTRACT

Systems and methods for thermal management of a propane fuel system are disclosed that include controlling a pressure of a fuel tank so that a fuel supply is available for starting of the engine even during cold ambient conditions.

20 Claims, 2 Drawing Sheets

PROPANE FUEL SYSTEM THERMAL MANAGEMENT SYSTEMS AND METHODS

FIELD OF THE INVENTION

This disclosure relates generally to internal combustion engines, and more particularly to systems and methods for thermal management of a propane fuel for starting the internal combustion engine.

BACKGROUND

Propane fuel can be provided to a combustion chamber of an internal combustion engine for combustion to operate the engine. The propane fuel is stored at least partially in a liquid state under pressure in the fuel tank. However, some of the fuel is present as a vapor and fills the vapor space of the fuel tank. The vaporized fuel can be pulled from the tank and fed to the engine for combustion. A predetermined pressure is required in order for enough fuel vapor to be delivered for starting and running the engine.

During engine operation, heated coolant from the engine can be used to warm the fuel and increase the pressure to be able to maintain the fuel supply to the engine during cold ambient conditions. Once the engine is shut down, coolant is no longer supplied to the fuel tank. The fuel tank cools and the pressure of the fuel inside the fuel tank decreases toward saturated vapor pressure for the ambient conditions.

At very cold ambient conditions, the fuel tank pressure may not be sufficient to supply the engine with a proper amount of fuel. If the fuel tank temperature and pressure become too low, the engine will not be able to start because not enough fuel will be able to be supplied to meet the requirements for starting the engine. Therefore, there is a need for techniques that thermally manage the propane fuel so as to be able to start the engine, even under the coldest of ambient conditions.

SUMMARY

Systems and methods for thermally managing propane fuel system temperature and/or pressure are disclosed. The systems and methods include, for example, thermally managing a temperature and/or pressure of fuel tank and/or of a fuel of the fuel system to enable an engine start using the fuel. In an embodiment, the temperature and/or pressure of the fuel tank is thermally managed by automatically restarting the internal combustion engine in response to a fuel tank pressure condition.

In an embodiment, the engine is restarted in response to a pressure condition associated with the fuel tank to provide a heat source for increasing a temperature of the fuel in the fuel tank. In an embodiment, coolant warmed by operation of the restarted engine is circulated to the fuel tank to increase a temperature of the fuel tank and/or of fuel in the fuel tank. In an embodiment, fuel in the fuel tank is circulated to the engine to be warmed by operation of the restarted engine, and the warmed fuel is then returned to the fuel tank.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
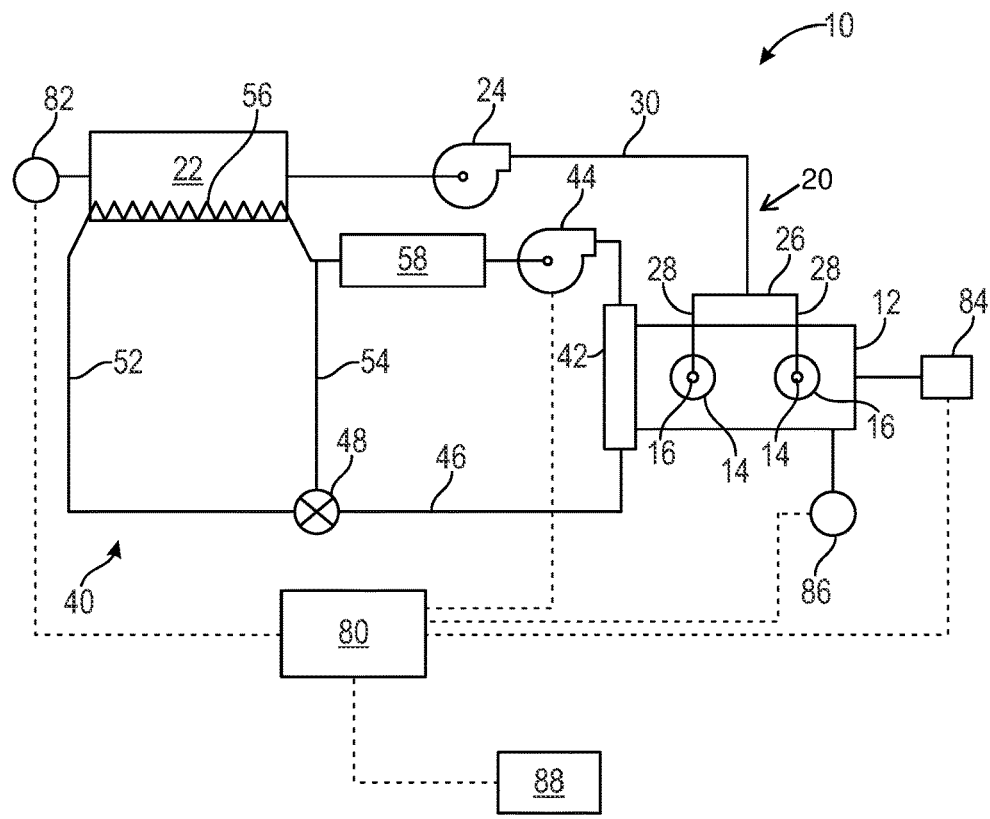
FIG. 1 shows an internal combustion engine and fuel system along with one embodiment of a thermal management system for managing the temperature and/or pressure of the fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, an internal combustion engine system 10 includes an internal combustion engine 12 and a fuel system 20 that provides fuel for operation of engine 12. FIG. 1 illustrates an embodiment where the engine 12 is a propane fueled engine, but other engine and fuel types are not precluded in the present disclosure. In an embodiment, internal combustion engine system 10 is configured to automatically restart engine 12, without an operator input, in response to one or more restart conditions.

The engine 12 can include a plurality of cylinders 14. FIG. 1 illustrates the plurality of cylinders 14 in a configuration that includes two cylinders in an in-line arrangement for illustration purposes only. Any number of cylinders and any arrangement of the cylinders suitable for use in an internal combustion engine can be utilized. The number of cylinders 14 that can be used can range from one cylinder to eighteen or more. Furthermore, the following description at times will be in reference to one of the cylinders 14. It is to be realized that corresponding features in reference to the described cylinder 14 can be present for all or a subset of the other cylinders of engine 12.

The cylinder 14 typically houses a piston (not shown) that is operably attached to a crankshaft (not shown) that is rotated by reciprocal movement of piston (not shown) in cylinder 14. A direct injector 16 may provide fuel to a combustion chamber (not shown) formed by the respective cylinder 14. In other embodiments, fuel can additionally or alternatively be provided to the combustion chamber by port injection, or by injection in the intake system, upstream of the combustion chambers of cylinders 14.

The fuel system 20 can be a high pressure fuel system in which the injector(s) is connected to a fuel tank 22. In an embodiment, fuel from the fuel tank 22 is pumped or circulated by a fuel pump 24 through a feed line 30 and fed to a common-rail 26 connected to the direct injectors 16. Fuel pump 24 can be a high pressure fuel pump, a low pressure fuel pump, or a high pressure fuel pump in combination with a low pressure fuel pump. In an embodiment, fuel pump 24 is an electrically operated fuel pump. Fuel pump 24 may be located in fuel tank 22, external to fuel tank 22, or both if two fuel pumps are provided.

The fuel fed from the fuel pump 24 is accumulated in the common-rail 26, and the accumulated fuel is supplied to the direct injector 16 of each cylinder 14 through a distribution line 28. The accumulated fuel in common rail 26 can be pressurized to boost and control the fuel pressure of the fuel delivered to combustion chamber of each cylinder 14.

In other embodiments, a fuel pump 24 is omitted and the pressure for providing the fuel from tank 22 is supplied by the pressure in fuel tank 22. In other embodiments, the common-rail 26 is omitted. The fuel system 20 may include additional features not specifically disclosed herein, such as sensors, check valves, distribution pumps, etc.

In the disclosed embodiment, the fuel supplied by the fuel system 20 is propane fuel that is stored under pressure in fuel tank 22. During non-operation of engine 12, the fuel tank 22 may decrease in temperature and the fuel pressure inside tank 22 will decrease to correspond to the saturated vapor pressure at the ambient condition. If the fuel tank pressure decreases below a certain point, the pressure in fuel tank 22 may not be sufficient to supply propane fuel to cylinders 14 for starting engine 12.

System 10 includes a cooling system 40 that includes a coolant for cooling the engine 12. In an embodiment, cooling system 40 includes a manifold 42 for distributing and collecting coolant from engine 12, a coolant pump 44 for circulating coolant through a coolant loop 46, a three-way valve 48 in coolant loop 46, and a radiator 58. Coolant loop 46 includes a fuel tank heating branch 52 and a fuel tank bypass 54 controlled by three-way valve 48. Fuel tank heating branch 52 includes fuel tank heating elements 56. Heating elements 56 can be any suitable device, configuration, or heat exchanger to transfer heat from the coolant to fuel tank 22. For example, heating elements 56 can include one or more coils, heat exchangers, heat transfer surfaces, heat transfer interfaces, or the like configured to transfer heat from the coolant to fuel tank 22.

The heating of the fuel tank 22 is controlled by a controller 80 in response to a pressure condition associated with fuel tank 22 to maintain fuel tank 22 at a desired temperature and/or pressure condition to be able to output an appropriate supply of fuel for starting engine 12, even under cold ambient conditions. Controller 80 is connected to a starter 84 that is configured to restart engine 12 in response to an engine restart condition determined by one or more inputs to controller 80 associated with the pressure of fuel tank 22.

In an embodiment, fuel tank 22 includes a pressure sensor 82 operable to output signals indicating a pressure condition in fuel tank 22. In an embodiment, a temperature sensor 86 is provided that is operable to output signals to controller 80 indicating a temperature condition of engine 12 and/or an ambient condition in and around engine 12. In an embodiment, controller 80 is connected to a remote temperature indicator 88, such as a transmitter that outputs a weather forecast or ambient condition at the location of system 10.

Controller 80 is configured to command starter 84 to restart engine 12 in response to a pressure condition associated with fuel tank 22 to maintain the starting capability of the fuel in fuel tank 22. In an embodiment, the pressure condition is the pressure of fuel tank 22 falling to or below a first threshold pressure. In response to the pressure condition falling to or below the first threshold pressure, controller 80 automatically restarts engine 12 to create a source of heat. The heat from operation of engine 12 is transferred to the coolant in cooling system 40, which is then circulated to fuel tank 22 to increase a temperature of the fuel tank 22 and/or the fuel therein.

Three-way valve 48 may be actuated to allow the heated coolant to circulate to heating elements 56 at fuel tank 22 to increase the temperature and/or pressure of fuel tank 22 and the fuel residing therein. Three-way valve 48 may be controlled to allow flow only in heating branch 52, in both heating branch 52 and bypass 54, or only in bypass 54 when no heating of fuel tank 22 is desired. Other embodiments contemplate other valve arrangements, such as a two-way valve only in heating branch 52, or two-way valves in each of heating branch 52 and bypass 54 that are independently controlled by controller 80.

In an embodiment, the engine 12 is shut down in response to the pressure condition of fuel tank 22 increasing to or above a second threshold pressure condition. The second threshold pressure condition is greater than the first threshold pressure condition to avoid repeated restarting and shutting down of engine 12. Alternatively, flow through heating branch 52 can be terminated by actuating three-way valve 48 or other valve when the second pressure threshold is reached while engine 12 remains in operation for other purposes.

Figure 2:
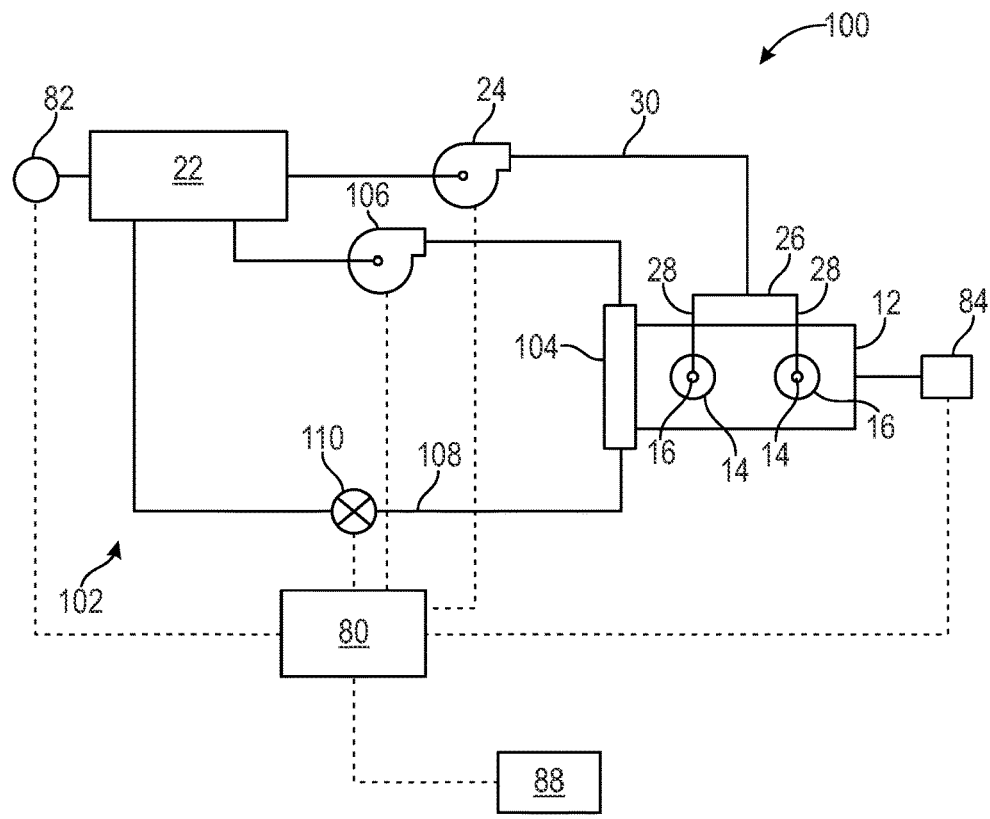
FIG. 2 is a schematic illustration of another embodiment system for thermal managing the fuel system.

In another embodiment shown in FIG. 2, there is a system 100 that is similar to system 10, and like elements are referenced with the same reference numerals. System 100 differs from system 10 in that system 100 includes a fuel circulation system 102. Fuel circulation system 102 includes a pump 106 to circulate fuel from fuel tank 22 to a component 104 of engine 12 to be heated. Pump 106 can be, for example, an electric pump. Pump 106 can be provided in addition to fuel pump 24 and used for fuel circulation for heating the fuel. Alternatively, fuel pump 24 can be used to circulate fuel from fuel tank 22 into fuel circulation system 102, such as by connecting fuel loop 108 to feed line 30 with a control valve or the like. Component 104 can be, for example, a manifold, engine block, heat exchanger, or the like that is capable of transmitting heat from a restarted engine 12 to the fuel.

The heated fuel from component 104 is returned to fuel tank 22 via fuel loop 108. A valve 110 may be provided to control the amount of fuel returned to fuel tank 22 by fuel loop 108. The circulation of fuel for heating in fuel circulation system 102 can be controlled based on a temperature and/or pressure condition of fuel tank 22 to maintain a desired target condition for engine starting and/or to avoid decreasing below a threshold temperature and/or pressure condition.

In the embodiments disclosed herein, the circulation of coolant and/or fuel to heat fuel tank 22 can be controlled based on tank pressure and/or a temperature condition to maintain the temperature and/or pressure of fuel tank 22 at a target condition and/or above a desired threshold level. In one embodiment, the fuel tank 22 can be pre-heated based on one or more temperature condition inputs, such as a temperature forecast from a remote temperature indicator 88, such as an intelligent transportation system or weather station, in communication with controller 80.

It is further contemplated that the first pressure threshold against which the engine restart is determined can vary in order to, for example, prevent unneeded engine restarts to improve fuel economy. For example, the first pressure threshold can be increased as ambient temperature conditions increase, and decreased as ambient temperature conditions decrease. The ambient temperature conditions may include one or more of an air temperature at the location of system 10, 100, an air temperature of the environment in which fuel tank 22 is located, an air temperature from a local weather report, and an air temperature at or near fuel tank 22 and/or engine 12. In another embodiment, system 10, 100 includes an operator actuator switch or setting that is set by the operator of system 10, 100 to vary the first pressure threshold.

A controller 80 is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10, 100 includes various sensors such as a pressure sensor 82 on fuel tank 22 to detect the fuel pressure and/or other properties of the fuel tank 22. Additionally or alternatively, a temperature sensor 86 detects temperature conditions of one or more of engine 12, ambient conditions in and around fuel tank 22 and/or engine 12, fuel temperature in fuel tank 22 or feed line 30, and/or other temperature conditions. Any other sensors known in the art for engine 12 and fuel system 20 are also contemplated, such as engine speed and/or load sensors. System 10, 100 can also include various actuators for opening and closing one or more valves 48, 110 and/or operating one or more pumps, fans, louvres, or other devices to control the coolant flow, coolant temperature, fuel flow, and/or fuel temperature. The actuators are not illustrated in FIGS. 1-2, but one skilled in the art would know how to implement the mechanism needed for each of the components to perform the intended function.

During operation, the controller 80 can receive information from the various sensors listed above through the I/O interface, process the received information using the processor based on an algorithm stored in the memory, and then send command signals to the various actuators through the I/O interface. For example, the controller 80 can receive information or input regarding a pressure condition of fuel tank 22, process the pressure condition input, and then based on the pressure condition input and control strategy, send one or more command signals to restart or stop engine 12, open or close one or more valves 48, 110, and/or operate or stop operation of one or more pumps 24, 44, 106 to increase or maintain a temperature and/or pressure of the fuel and/or fuel tank 22 to achieve a target condition for thermal management of the fuel system 20, 120.

The control procedures implemented by the controller 80 can be executed by a processor of controller 80 executing program instructions (algorithms) stored in the memory of the controller 80. The descriptions herein can be implemented with system 10 and/or system 100. In certain embodiments, the system 10, 100 further includes a controller 80 structured or configured to perform certain operations to control system 10, 100 in achieving one or more target conditions. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 3:
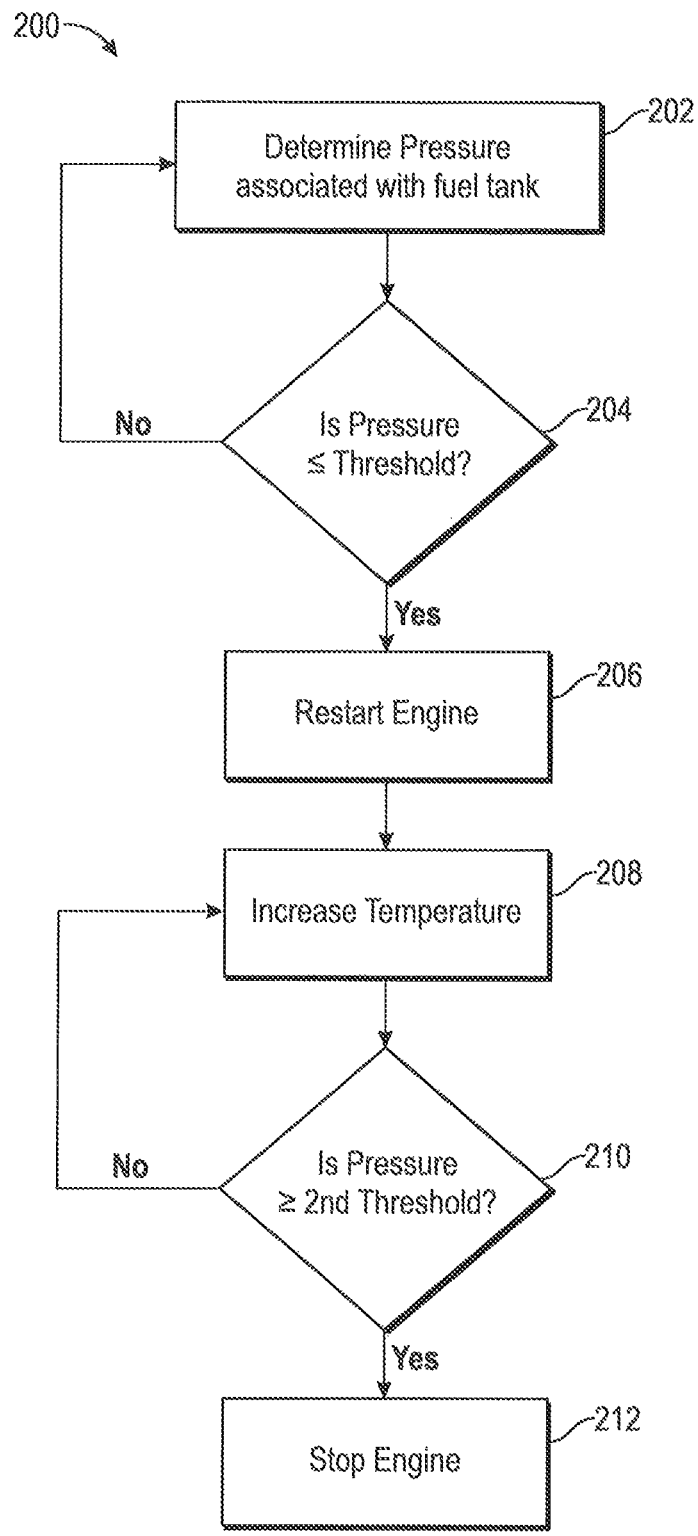
FIG. 3 shows a flow diagram of one embodiment of a procedure for thermally managing the fuel system of the internal combustion engine.

Referring to FIG. 3, a flow diagram of a procedure 200 for thermally managing fuel tank 22 of an internal combustion engine system 10, 100 is provided. Procedure 200 begins at operation 202 to determine a pressure condition associated with fuel tank 22, such as from a pressure signal from pressure sensor 82. Procedure 200 continues at conditional 204 to determine if the pressure condition is at or below a first pressure threshold. As discussed above, the first pressure threshold can be a pressure of fuel tank 22 that is desired to be maintained in order to be able to start engine 12. The first pressure threshold can be a set, predetermined pressure threshold. Alternatively, the first pressure threshold can vary based on one or more of an operator selected pressure threshold, an ambient temperature condition, a weather forecast, an ambient condition in the room or environment in which system 10, 100, engine 12, and/or fuel tank 22 is located.

In response to conditional 204 being NO, procedure 200 returns to operation 202 to continue to monitor the pressure condition of fuel tank 22. In response to conditional 204 being YES, procedure 200 continues at operation 206 to restart engine 12. Engine 12 can be restarted automatically with starter 84 to provide a heat source to thermally manage fuel tank 22 to maintain the temperature and/or pressure of fuel tank 22 above a pressure threshold associated with an engine starting capability for engine 12.

Procedure 200 continues at operation 208 to increase the fuel temperature by thermally managing fuel tank 22. Fuel tank 22 can be thermally managed by, for example, circulating a coolant warmed by operation of engine 12 to exchange heat with the fuel tank 22 and/or the fuel in fuel tank 22. Alternatively, fuel tank 22 can be thermally managed by circulating fuel from fuel tank 22 to a warmed engine 12 or to a component warmed by operation of engine 12, and returning the heated fuel to fuel tank 22.

Procedure 200 continues at conditional 210 to determine if the pressure condition of fuel tank 22 is at or above a second pressure threshold. If conditional 210 is NO, procedure 200 continues at operation 208 to continue to increase the temperature of fuel tank 22 and/or the fuel therein. If conditional 210 is YES, procedure 200 continues at operation 212 to stop operation of engine 12. The thermal management of the fuel tank 22 can be stopped in response to at least one of a temperature condition and a pressure condition of the fuel tank 22 indicating an engine starting capability of engine 12 is satisfied. After the engine is stopped at operation 212, procedure 200 can end or return to operation 202 to continue to monitor the pressure conditions of fuel tank 22 to maintain the engine start capability for the fuel in fuel tank 22.

In an embodiment of procedure 200, engine 12 is stopped before the pressure condition of fuel tank 22 reaches the second pressure threshold. Coolant pump 44 (or other pump) is an electrically operated pump and used to circulate warm coolant from engine 12 to fuel tank 22 and back, even after the engine 12 is shut down. The coolant continues to circulate to the fuel tank 22 and is able to warm fuel tank 22 after the engine 12 is shut down due to residual heat in the engine coolant, allowing fuel savings to be realized over continuing to operate engine 12. In a variation of this embodiment, if the coolant temperature is above a threshold temperature, an electric coolant pump is used to circulate coolant to fuel tank 22 without operating engine 12 until the coolant temperature falls below a second threshold temperature, at which time the engine 12 may be restarted if the fuel tank pressure condition is not satisfied.

In another embodiment of procedure 200, fuel pump 24 and/or pump 106 is an electric pump and does not operate in dependence of the operation of engine 12. Fuel pump 24 and/or pump 106 can be used to circulate fuel to a warm engine 12 after the engine is shut down and no longer running. In this embodiment, the operation of the fuel pump can be controlled in response to an engine temperature condition being at or above a certain temperature threshold. The engine temperature condition can be determined based on, for example, a coolant temperature, a metal temperature, or other appropriate temperature associated with the shut down engine 12 that is indicative of an ability of the engine 12 to heat the fuel. The electric pump 24 and/or 106 may operate until the temperature condition associated with engine 12 drops below a threshold, or the pressure in the fuel tank 22 exceeds a certain pressure threshold, or the battery voltage used to operate the pump 24, 106 drops below a threshold. Engine 12 can then be restarted if additional thermal management of the fuel is needed.

Various aspects of the present disclosure are contemplated. In one aspect, a method includes determining a pressure associated with a fuel tank, the fuel tank including a fuel for operating an internal combustion engine; restarting the internal combustion in response to the pressure associated with the fuel tank indicating a restart condition; and increasing a temperature of the fuel tank with heat generated from operating the restarted internal combustion engine to maintain an engine start capability of the fuel.

In an embodiment of the method, increasing the temperature includes circulating a fluid that is heated by operation of the internal combustion engine to heat the fuel tank. In a refinement of this embodiment, the fluid is a liquid coolant. In a further refinement, the liquid coolant is circulated from the internal combustion engine to the fuel tank and back to the internal combustion engine until the pressure associated with the fuel tank reaches a pressure threshold that is greater than the pressure associated with the restart condition.

In another embodiment of the method, increasing the temperature of the fuel tank includes circulating the fuel from the fuel tank to the internal combustion engine to be heated by operation of the internal combustion engine.

In an embodiment, the method includes comparing the pressure associated with the fuel tank with a first pressure threshold, and the internal combustion is restarted in response to the pressure associated with the fuel tank falling at or below the first pressure threshold. In a refinement of this embodiment, the method includes stopping the internal combustion engine in response to the pressure of associated with the fuel tank reaching a second pressure threshold that is greater than the first pressure threshold. In another refinement, the first pressure threshold is based on an ambient temperature associated with the internal combustion engine. In yet a further refinement, the first pressure threshold is based on a weather report. In another refinement, the first pressure threshold is based on an operator input.

In another embodiment, the method includes shutting down the restarted internal combustion and increasing or maintaining the temperature of the fuel tank with heat generated from operation of the shut down internal combustion engine to maintain the engine start capability of the fuel.

According to another aspect of the present disclosure, a system includes an internal combustion engine including a plurality of cylinders that receive a fuel from a fuel tank. The fuel tank is thermally connected to the internal combustion engine. The system also includes a controller configured to receive one or more inputs associated with a pressure of the fuel tank and to automatically start and stop the internal combustion engine. The controller is configured to automatically start the internal combustion engine in response to the pressure of the fuel tank falling at or below a restart pressure threshold in order to thermally manage the fuel in the fuel tank to maintain an engine start capability of the fuel.

In an embodiment, the controller is configured to automatically stop the internal combustion engine in response to the pressure of the fuel tank reaching a second pressure threshold that is greater than the restart pressure threshold.

In an embodiment, the restart pressure threshold varies based on an ambient temperature around the internal combustion engine or a weather input into the controller. In an embodiment, the restart pressure threshold is modifiable by an operator selected input.

In an embodiment, the system includes a cooling system including a coolant for receiving heat from the operation of the internal combustion engine. The controller is configured to circulate coolant to the fuel tank to thermally manage the fuel in the fuel tank after the internal combustion engine is restarted. In a refinement of this embodiment, the controller is configured to stop circulation of coolant to the fuel in the fuel tank while the pressure of the fuel tank is at or above a second threshold greater than the restart pressure threshold.

In an embodiment, the system includes a fuel circulation loop configured to circulate fuel from the fuel tank to the internal combustion engine to receive heat from the operation of the internal combustion engine. The controller is configured to circulate fuel from the fuel tank to the engine and back to the fuel tank to thermally manage the fuel in the fuel tank. In a refinement of this embodiment, the controller is configured to stop circulation of the fuel to the internal combustion engine in the fuel circulation loop in response to the pressure condition associated with the fuel tank being at or exceeding a second pressure threshold greater than the restart pressure threshold.

In an embodiment, the system includes a pressure sensor associated with the fuel tank. The controller is configured to receive pressure signals from the pressure sensor indicating the pressure of the fuel tank.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a pressure associated with a fuel tank, the fuel tank including a fuel for operating an internal combustion engine, wherein the internal combustion engine is shut down during the determining the pressure;
   automatically restarting the shut down internal combustion engine in response to the pressure associated with the fuel tank falling to or below a first pressure threshold indicating a restart condition while the internal combustion engine is shut down, the first pressure threshold being above a saturated vapor pressure of the fuel in the fuel tank in which the pressure in the fuel tank is insufficient to supply fuel to the plurality of cylinders, wherein the restart condition maintains a pressure condition of the fuel tank to be able to output a supply of fuel capable of automatically restarting the internal combustion engine;
   increasing a temperature of the fuel tank with heat generated from operating the automatically restarted internal combustion engine to maintain an engine start capability of the fuel; and
   automatically shutting down the automatically restarted internal combustion engine in response to the pressure associated with the fuel tank increasing to or above a second pressure threshold that is greater than the first pressure threshold.

2. The method of claim 1, wherein increasing the temperature includes circulating a fluid that is heated by operation of the internal combustion engine to heat the fuel tank.

3. The method of claim 2, wherein the fluid is a liquid coolant.

4. The method of claim 3, wherein the liquid coolant is circulated from the internal combustion engine to the fuel tank and back to the internal combustion engine until the pressure associated with the fuel tank reaches the second pressure threshold.

5. The method of claim 1, wherein increasing the temperature of the fuel tank includes circulating the fuel from the fuel tank to the internal combustion engine to be heated by operation of the internal combustion engine.

6. The method of claim 1, wherein the first pressure threshold is increased as ambient temperature increases and is decreased as ambient temperature decreases.

7. The method of claim 1, further comprising, after automatically shutting down the automatically restarted internal combustion engine, allowing the pressure associated with the fuel tank to decrease from the second pressure threshold to the first pressure threshold while the internal combustion engine is shut down before again automatically restarting the shut down internal combustion engine.

8. The method of claim 1, wherein the first pressure threshold is based on an ambient temperature associated with the internal combustion engine.

9. The method of claim 1, wherein the first pressure threshold is based on a weather report.

10. The method of claim 1, wherein the first pressure threshold is varied based on an operator input.

11. The method of claim 1, further comprising shutting down the restarted internal combustion engine and increasing or maintaining the temperature of the fuel tank with heat generated from operation of the shut down internal combustion engine to maintain the engine start capability of the fuel by:
    circulating warm coolant from the engine to the fuel tank and back to the internal combustion engine while the internal combustion engine is shut down until a temperature of the coolant drops below a temperature threshold, after which the internal combustion engine is automatically restarted to maintain the pressure condition at or above the first pressure threshold; or
    circulating fuel from the fuel tank to the internal combustion engine and back to the fuel tank while the internal combustion engine is shut down until a temperature associated with the internal combustion engine drops below a temperature threshold after which the internal combustion engine is automatically restarted to maintain the pressure condition at or above the first pressure threshold.

12. A system, comprising:
    an internal combustion engine including a plurality of cylinders that receive a fuel from a fuel tank, wherein the fuel tank is thermally connected to the internal combustion engine; and
    a controller configured to receive one or more inputs associated with a pressure of the fuel tank and to automatically start and stop the internal combustion engine, wherein the controller is configured to:
       determine the pressure of the fuel tank has fallen at or below a restart pressure threshold indicating a restart condition, the restart pressure threshold being above a saturated vapor pressure of the fuel in the fuel tank in which the pressure in the fuel tank is insufficient to supply fuel to the plurality of cylinders while the internal combustion engine is shut down;
       automatically start the shut down internal combustion engine in response to determining the pressure of the fuel tank has fallen at or below the restart pressure threshold while the internal combustion engine is shut down in order to thermally manage the fuel in the fuel tank to maintain an engine start capability of the fuel, wherein the restart pressure threshold maintains a pressure condition of the fuel tank to be able to output a supply of fuel capable of automatically starting the internal combustion engine; and
       automatically shut down the automatically started internal combustion engine in response to the pressure associated with the fuel tank increasing to or above a second pressure threshold that is greater than the restart pressure threshold.

13. The system of claim 12, wherein, after automatically shutting down the automatically restarted internal combustion engine, the controller is configured to allow the pressure associated with the fuel tank to decrease from the second pressure threshold to the restart pressure threshold whole the internal combustion engine is shut down before automatically starting the shut down internal combustion engine.

14. The system of claim 12, wherein the restart pressure threshold varies based on an ambient temperature around the internal combustion engine or a weather input into the controller.

15. The system of claim 12, wherein the restart pressure threshold is modifiable by an operator selected input.

16. The system of claim 12, further comprising:
a cooling system including a coolant for receiving heat from the operation of the internal combustion engine, wherein the controller is configured to operate an electric pump to circulate coolant to the fuel tank to thermally manage the fuel in the fuel tank after the internal combustion engine is restarted, wherein the controller is further configured to operate the electric pump to continue circulate coolant to the fuel tank to thermally manage the fuel tank at or above the restart pressure threshold after the internal combustion engine is shut down until a temperature of the coolant drops below a temperature threshold, after which the controller is configured to automatically restart the internal combustion engine to maintain the pressure condition at or above the restart pressure threshold.

17. The system of claim 16, wherein the controller is configured to stop circulation of coolant to the fuel in the fuel tank while the pressure of the fuel tank is at or above the second pressure threshold.

18. The system of claim 12, further comprising:
a fuel circulation loop configured to circulate fuel from the fuel tank to the internal combustion engine to receive heat from the operation of the internal combustion engine, wherein while the internal combustion engine is shut down, the controller is configured to circulate fuel from the fuel tank to the engine and back to the fuel tank to thermally manage the fuel in the fuel tank until a temperature condition associated with the internal combustion engine drops below a temperature threshold, after which the controller is configured to automatically restart the internal combustion engine to maintain the pressure condition at or above the restart pressure threshold.

19. The system of claim 18, wherein the controller is configured to stop circulation of the fuel to the internal combustion engine in the fuel circulation loop in response to the pressure condition associated with the fuel tank being at or exceeding the second pressure threshold greater than the restart pressure threshold.

20. The system of claim 12, further comprising a pressure sensor associated with the fuel tank, wherein the controller is configured to receive pressure signals from the pressure sensor indicating the pressure of the fuel tank.

* * * * *